D. J. ANGUS.
BRAKE MECHANISM FOR VEHICLES.
APPLICATION FILED DEC. 13, 1916. RENEWED JAN. 7, 1920.
1,356,032.
Patented Oct. 19, 1920.
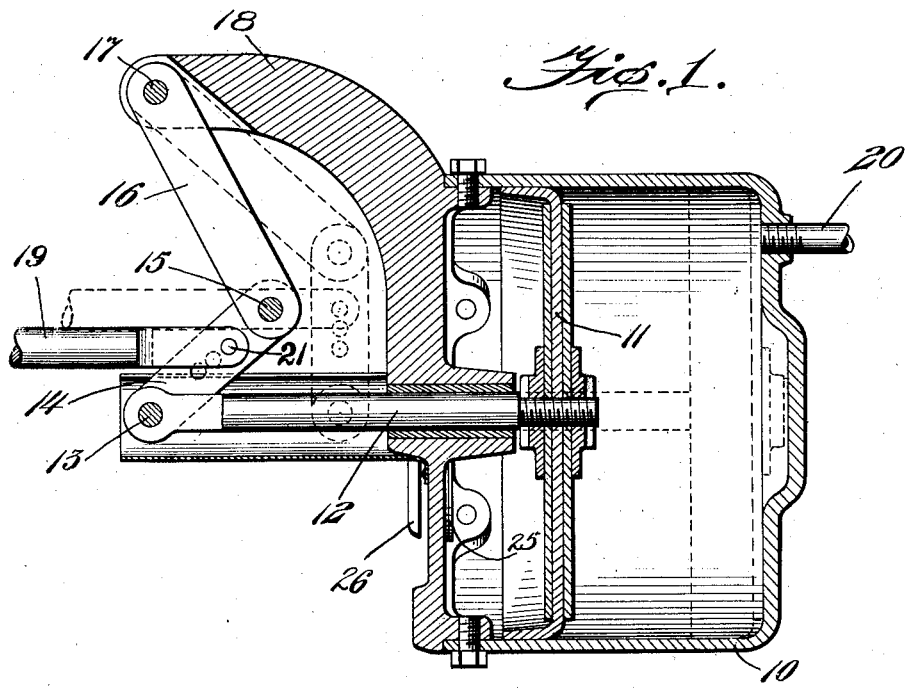
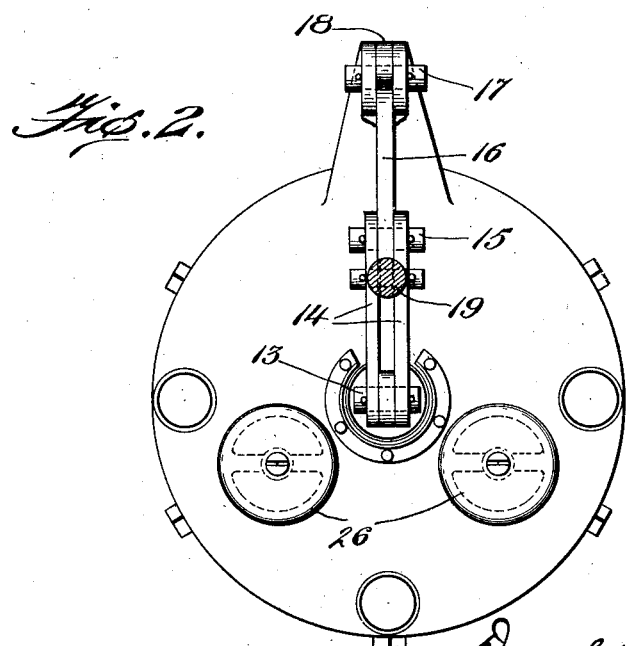
Inventor
Donald J. Angus
By Bradford Doolittle
Attorneys

UNITED STATES PATENT OFFICE.

DONALD J. ANGUS, OF INDIANAPOLIS, INDIANA, ASSIGNOR TO CARL G. FISHER AND JAMES A. ALLISON, BOTH OF INDIANAPOLIS, INDIANA.

BRAKE MECHANISM FOR VEHICLES.

1,356,032.     Specification of Letters Patent.     Patented Oct. 19, 1920.

Application filed December 13, 1916, Serial No. 136,734. Renewed January 7, 1920. Serial No. 350,061.

*To all whom it may concern:*

Be it known that I, DONALD J. ANGUS, a citizen of the United States, residing at Indianapolis, Marion county, and State of Indiana, have invented and discovered certain new and useful Improvements in Brake Mechanism for Vehicles, of which the following is a specification.

In brake operating mechanism of the usual type, such as commonly employed in automobile construction, it requires much greater power toward and at the end of the movement of the operating lever than at the start, because of the fact that no resistance is met at the start, while the resistance increases rapidly as soon as the brakes begin to impinge upon the friction surface of the brake drum.

My said invention relates to means whereby this trouble may be overcome, and the operating power required at the end of the movement be practically no greater than at the start. I have illustrated my invention in connection with a vacuum power operated brake mechanism of the general type illustrated in Dickson Patent No. 1,076,198, but do not wish to be understood as limiting my invention to use in connection with this particular apparatus.

In the accompanying drawings, which are made a part hereof,

Figure 1 is a central longitudinal section through a vacuum power cylinder of the general type shown in said Dickson patent, and connected with the brake rod by the means of my said invention, and Fig. 2 a front elevation thereof, the connection with the brake rod being omitted.

In the structure shown, 10 represents a cylinder in which is mounted a reciprocating piston 11, having a piston rod 12 which extends through a bearing in the head of said cylinder to the outside, and is connected at its outer end, by a pivot 13, with a link 14. Said link is connected at its other end, by a pivot 15, with the end of another link 16, the opposite end of said link 16 being pivoted at 17 to an overhanging bracket 18 on the head of said cylinder. The brake operating rod 19 is connected to the link 14 midway between the pivots 13 and 15, or at any point desired, to secure the leverage needed. Said brake rod 19 runs to the brake operating mechanism, which may be of any well-known or appropriate type and is not illustrated herein. The vacuum cylinder 10 is connected by a pipe 20 with the intake manifold of the engine, in a manner similar to that illustrated in said Dickson patent, and is provided with appropriate valve mechanism for controlling the operation. Link 14 is preferably a double link, as best illustrated in Fig. 2, the brake rod 19 being flattened at its end and connected therewith by being inserted between the two members, as shown in Fig. 1. The outer end of the cylinder is provided with openings protected by screens 25 and cover plates 26, as shown.

The operation is as follows: The parts being in the position shown in Fig. 1, the brake is off. It being desired to set the brake, a vacuum is created in cylinder 10, back of piston 11, and said piston is drawn back in said cylinder, bringing with it the compound lever composed of the links 14 and 16. At the start of the movement, link 14, standing at a considerable angle (practically a right angle) to link 16, the fulcrum is practically at the pivot 17. As the movement backward progresses, link 16 assumes the position shown in dotted lines and link 14, turning on pivot 15, changes from its inclined position to an upright position thereby increasing proportionately its leverage between point 13 and connecting point 21 of the brake rod 19 thus increasing the braking power as the piston approaches the end of its stroke so that comparatively little power is required to set and hold the brake.

Having thus fully described my said invention, what I claim as new and desire to secure by Letters Patent, is:

1. In a brake mechanism, the combination of a compound lever pivoted at one end to a fulcrum and pivoted at the other end to a power applying means whereby the last mentioned pivot is constrained to move in a straight line, and a brake rod connected at one end intermediate of the joint in the compound lever and the power applying means and at its other end connected to the brake setting mechanism, substantially as set forth.

2. In a brake mechanism, the combination of a lever formed in two parts and hinged together and pivoted at one end to a fixed fulcrum and at its other end to a part constrained to move in a straight line for operating the brake rod, and the brake rod connected to one member of said lever between the movable part and the joint therein, substantially as set forth.

3. In a brake setting mechanism, the combination of a vacuum power cylinder, a piston therein, a piston rod connected with said piston and extending to the outside thereof, a jointed lever connected at one end to said piston rod and at its lower end to a fixed fulcrum, and the brake rod connected to one member of said lever between the connection with the piston rod and the joint in the lever, substantially as set forth.

4. In a brake mechanism, the combination of a power operating device, a link having a fixed pivot point, a lever pivotally connected to said link and to the power operating device constrained to move in a straight line, and a brake rod pivotally connected to said lever intermediate the pivotal points thereof, substantially as set forth.

5. In a brake mechanism, the combination of a power operating device, a link having a fixed pivot point, a lever pivotally connected to said link at the free end thereof and at its other end to said power device whereby the last mentioned pivot is constrained to move in a straight line, and a brake rod pivotally connected to said lever intermediate the pivotal ends thereof, substantially as set forth.

In witness whereof I have hereunto set my hand and seal at Indianapolis, Indiana, this 11th day of December, A. D. nineteen hundred and sixteen.

DONALD J. ANGUS. [L. S.]

Witnesses:
 GEORGE G. RINIER,
 A. J. WEBER.